United States Patent [19]

Epling

[11] 4,015,194
[45] Mar. 29, 1977

[54] OIL WELL LOGGING DEVICE HAVING PLURAL WELL FLUID PARAMETER MEASURING DEVICES AND A SINGLE CONDUCTOR FOR ACCOMMODATING BOTH MEASUREMENT AND POWER SIGNALS

[75] Inventor: Karol E. Epling, Fountain Valley, Calif.

[73] Assignee: Production Data Inc., Long Beach, Calif.

[22] Filed: July 3, 1975

[21] Appl. No.: 592,981

[52] U.S. Cl. .................................. 324/1; 73/155; 324/11; 340/18 CM; 340/18 P
[51] Int. Cl.$^2$ ........................................ G01V 3/18
[58] Field of Search .............. 324/1, 11, 2; 73/155, 73/152; 340/18 R, 18 CM, 18 P

[56] References Cited

UNITED STATES PATENTS

| | | | |
|---|---|---|---|
| 2,332,873 | 10/1943 | Silverman | 324/1 X |
| 2,570,111 | 10/1951 | Goble | 324/1 |
| 2,588,748 | 3/1952 | Niles et al. | 324/1 X |
| 2,722,657 | 11/1955 | Janssen | 324/1 |
| 2,785,374 | 3/1957 | Fay et al. | 324/1 |
| 2,848,710 | 8/1958 | Owen | 324/1 X |
| 3,116,448 | 12/1963 | Vogel | 324/1 |
| 3,172,036 | 3/1965 | Waters | 324/1 |
| 3,279,249 | 10/1966 | Tocanne | 324/11 X |
| 3,465,239 | 9/1969 | Wilson et al. | 324/1 |
| 3,876,471 | 4/1975 | Jones | 324/1 X |

Primary Examiner—Gerard R. Strecker
Attorney, Agent, or Firm—William C. Babcock

[57] ABSTRACT

An immersible instrumentation array for sampling the oil percentage, temperature and flow rate of well fluid comprising a plurality of circuit wafers, each including feedthrough connections, such wafers being arranged in an axial column having various instruments dispersed therethrough. This arrangement allows immersion of the instrumentation array into a well bore with minimal restriction to flow. To permit insertion of the array to various well depths, a single lead shielded coaxial cable attaches to the top of the array providing both the power to the various instruments and returning the measurement signals through the feedthrough connections in the wafers. To accommodate both the power signal and the measurement signals within a single lead, the signals are separated by frequency, the instrument readouts being selected in sequence by way of a pulse commutation technique.

4 Claims, 8 Drawing Figures

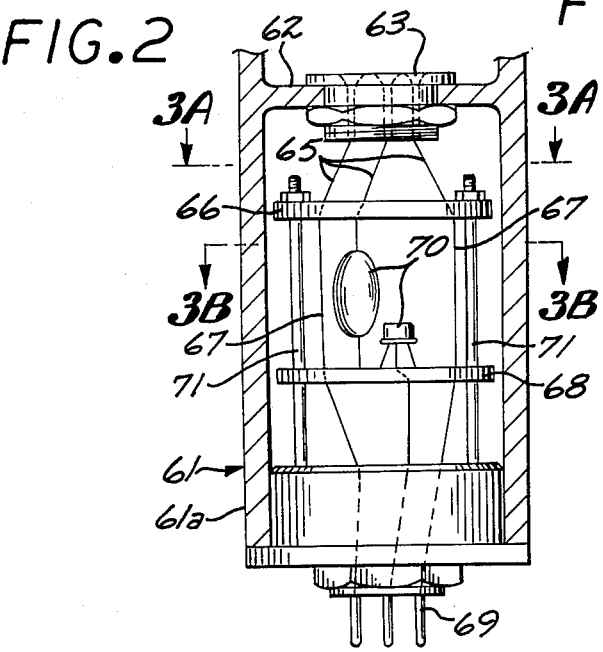
FIG. 2
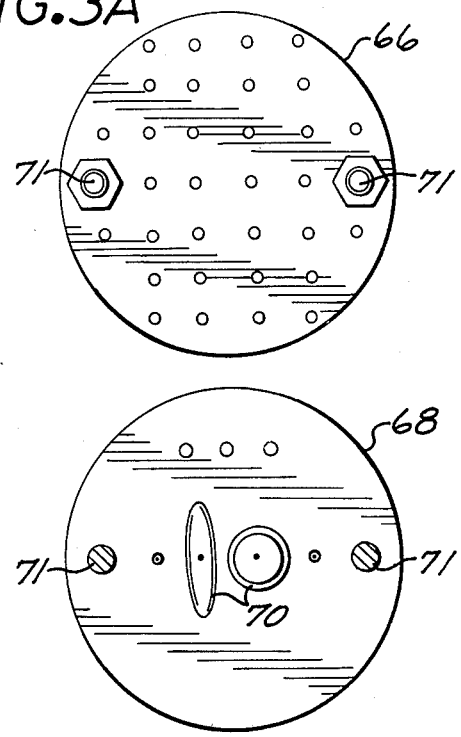
FIG. 3A
FIG. 3B
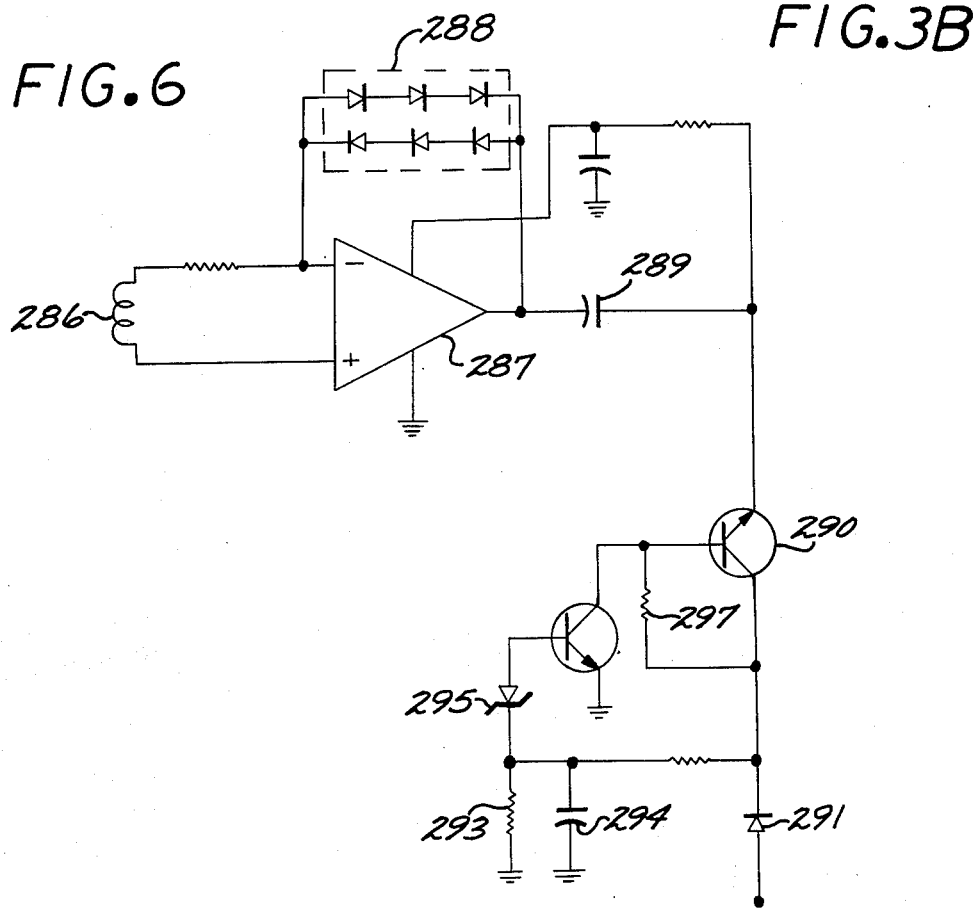
FIG. 6

OIL WELL LOGGING DEVICE HAVING PLURAL WELL FLUID PARAMETER MEASURING DEVICES AND A SINGLE CONDUCTOR FOR ACCOMMODATING BOTH MEASUREMENT AND POWER SIGNALS

BACKGROUND OF THE INVENTION

1. Field of the Invention:

The present invention relates to oil well logging apparatus, and more particularly to an oil well immersible instrument array which provides various measured indications such as the percentage of oil within the well fluid, the timperature of the fluid, the flow rate of the fluid and the pressure of the fluid at various stations in the well.

2. Description of the Prior Art:

Collection of crude petroleum very often entails economic considerations beyond the determination of mere presence of crude oil. Most often the economics of producing oil are complicated by overabundant presence of subterranean water flows which may enter a well bore at various depths. Since all the fluids are ordinarily pumped out of the well bore, an overabundant presence of water mixed with the oil inordinately increases pumping costs. Very often the percentage of water that has to be pumped in order to bring out, or produce, the oil is so high that oil production becomes uneconomical.

In most well bores, a casing is utilized which at various stations includes lateral perforations through which the fluids below ground enter the bore. In the past, various techniques have been developed by which selected perforations can be sealed off so that fluid flow only from selected subsurface strata is permitted to enter the bore. It thus became essential in the art to develop measurement techniques to determine the relative percentages, or the relative proportions, of water at various bore stations and thereby determine which stations are to be sealed off. In order to achieve a comprehensive reading or measurement with respect to bore station, multiple parameters are required, such as the fluid composition, the flow rate of the fluid, the pressure head and temperature.

Most prior art devices directed at such measurement of the fluid composition within a well bore required extensive local instrumentation which resulted in large packages tending to restrict the flow and thereby introducing an extraneous source of error. In addition, such prior art instrumentation arrays were limited to only a few or a single measuring instrument for each insertion into the well bore. This resulted in an increase in cost of the measuring process and furthermore increased the inaccuracy of the measurement process since measurements were distributed with time, with the attendant loss of instantaneous cross-correlation.

SUMMARY OF THE INVENTION

Accordingly, it is the general purpose and object of the present invention to provide a well bore instrument array adapted to provide a plurality of parameter measurements in a single insertion and conformed to produce a minimal flow restriction within the well bore. Further objects of the invention are to provide a well bore instrument having a plurality of sensors all conveniently stacked into an elongated cylinder. Yet other objects of the invention are to provide fluid composition instruments which are powered from a common power supply at the surface of the well and which furthermore return the measurement signal superposed over the power signal to minimize cable size.

These and other objects are accomplished within the present invention by arranging the components of various circuit sections associated with each instrument into a cylindrical wafer, each wafer having selected feedthrough connections thereacross whereby one instrument can be stacked on top of another instrument. In addition, many circuit sections associated with the respective instruments include common circuits such that interchangeable or plural use of a single circuit wafer can be made with various instruments.

More specifically, both the instruments and the associated circuit wafers are arranged in an instrument canister of elongated cylindrical form, made up of a plurality of axial stages, each stage comprising a cylindrical outer housing conformed for axial connection with succeeding stages, each cylindrical housing receiving on the interior thereof the above circuit wafers also axially arranged to interface longitudinally with succeeding adjacent curcuit wafers across corresponding connectors. The connector provides connections both for the signals developed by the wafer and for the feedthrough connections. Since it is contemplated to allow for a fairly broad instrumentation arrangement within a single probe, in addition to the cable load the feedthrough requirements normally would impose a heavy circuit load on the wafer itself. Accordingly, the present invention further incorporates a commutated serial selection of instruments whereby only few feedthrough connections are necessary to accommodate any number of instruments stacked in a single prob.

Thus the present invention contemplates commutation techniques by way of which the signals generated from each measuring device are sequentially impressed onto the feedthrough lines and the various instruments are read sequentially as they are brought to a particular station of the well bore. This signal arrangement allows for a single lead cable, which, by its shield supports the instrument array.

More specifically, well bores often extend to depths in the order of 5,000 to 9,000 feet. At such depths, multistrand or parallel signal returns present a problem both in terms of the conduit weight and in terms of possible crosstalk between the various signals. The use of multiple shielded cables to achieve good isolation between the various signal leads to the surface of the well introduces a gross multiplication of the weight of the cable. Accordingly, the present invention arrangement minimizes the weight of the cable itself, allowing furthermore of a convenient arrangement of the structural elements of the cable by concentrating all of the load-bearing cable structure in the shield. This shield around the center cable isolates the various environmental effects along the cable, thus optimizing both the cable weight and the signal fidelity passed along that cable.

In specific arrangement, it is contemplated by way of this invention to provide a D.C. power supply on the surface of the well, such D.C. power supply connecting to the center lead of the signal cable to be brought down to the various instruments of the probe by way of the above feedthrough connections. The same center conductor of the cable is, again at the surface of the well, connected across a coupling capacitor to a squaring circuit which excites various frequency-to-voltage converters for recording. The selection of the particular frequency-to-voltage converter and therefore the particular channel on which a recording is made, is done by way of pulse commutation which concurrently selects the particular instrument within the probe. Thus, as the probe is passed into the interior of the well bore, it provides various measurements such as pressure, temperature, liquid composition and flow rate, all of which provide, in sequence, output signals in the form of a pulse rate signal which according to the frequency-to-voltage conversion on the surface of the well provide the indications of the parameter measured.

BRIEF DESCRIPTION OF THE DRAWINGS

FIG. 2 is a side view in partial cross section of a circuit breaker adapted for use with the present invention;

FIGS. 3A and 3B are plan view drawings of two circuit boards comprising the wafer shown in FIG. 2;

FIG. 6 is a circuit schematic illustrating a flow rate measuring circuit adapted for use with the present invention.

DESCRIPTION OF THE SPECIFIC EMBODIMENT

While the present description is directed at illustrating a particular selected arrangement of well logging instruments into a single instrument array, the instrument selection shown is for purposes of illustration only. Various other instrument selections can be made utilizing the basic inventive concepts and are therefore contemplated within the scope of this disclosure.

Figure 1:
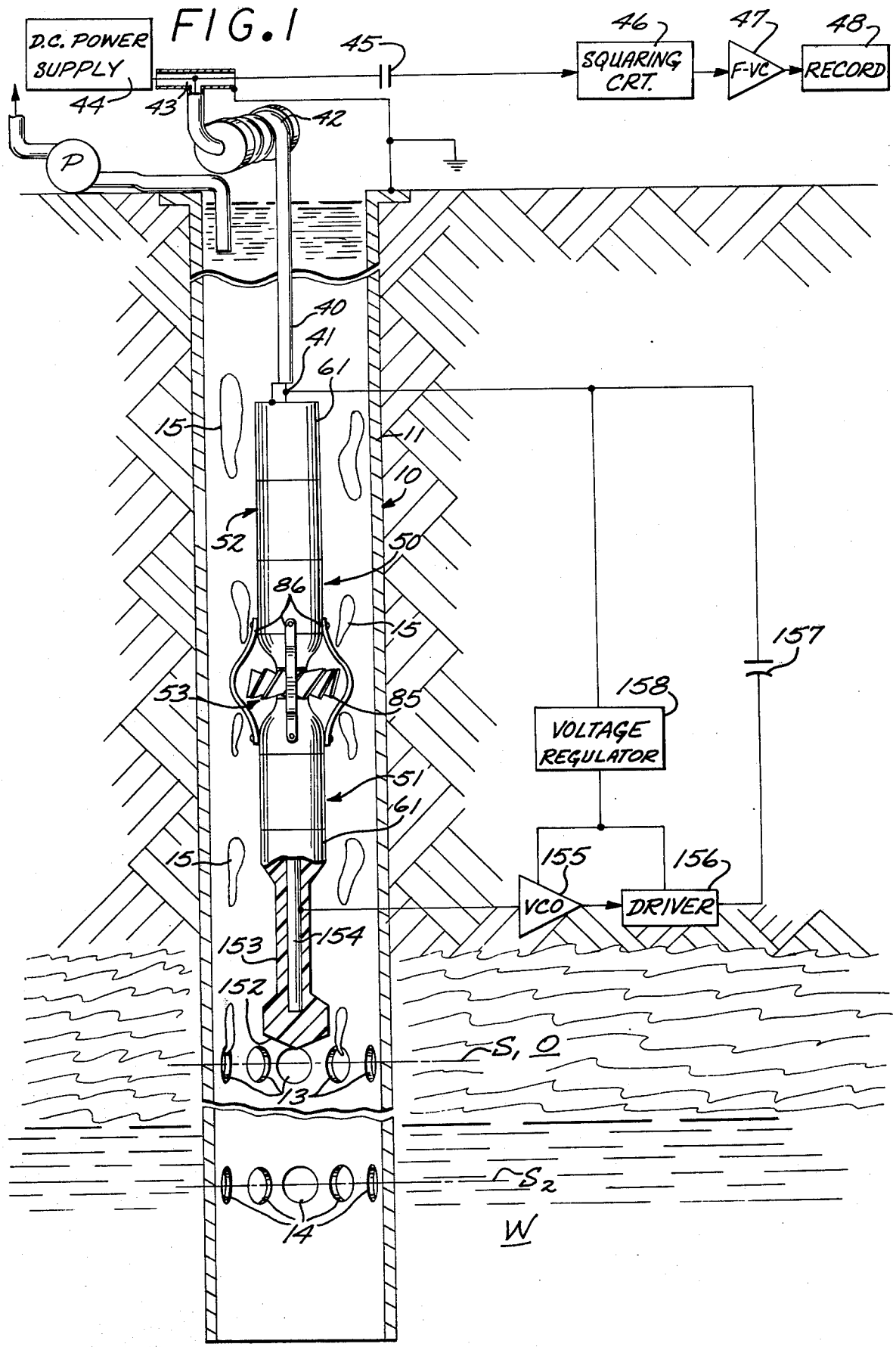
FIG. 1 is a diagrammatic illustration in partial cross section of one embodiment of the present invention.

As shown in FIG. 1, a well bore, generally designated by the numeral 10, includes a cylindrical casing 11 having a plurality of openings 13 and 14 formed in the wall thereof at axial stations $S_1$ and $S_2$, respectively. As shown in this illustration, the axial station $S_1$ of openings 13 is in an oil-bearing strata designated as strata 0. Openings 14, on the other hand, are illustrated within a water-bearing strata W and introduce a large amount of water into the interior of the well bore 10. The resulting flow at or above station $S_1$, or above openings 13, is therefore a combined flow dominantly composed of water entering at station $S_2$ with a plurality of oil droplets entering at station $S_1$. The liquid composition comprising the water entering at openings 14 and the droplets 15 is then pumped out by a pump P on the surface opening of the well.

Thus, the pumping load of pump P and the consequent separation load is grossly dependent on the relative proportions of water and oil droplets 15. In order to reduce the pumping load, it has been generally practiced in the past to selectively isolate the more productive stations by, for example, sealing off the less productive stations, such as station $S_2$, or the openings 14. Most often, this was done by the process of cementing off the undesired stations along the length of the casing 11. Before a decision can be made as to which station is to be cemented off, some indication is necessary on the productive output at that station.

Besides the restriction imposed by the openings 13 and 14, the total volumetric production of any one station also depends on the composition of the strata immediately adjacent that station. Thus, for example, station $S_1$ at the openings 13 may be within a relatively low porosity stratum and the total fluid flow therethrough may be fairly low. Station $S_2$, or openings 14, may however be within a porous stratum and the contribution of water at that station may therefore constitute a large contribution to the total flow. Thus, besides measuring the percentage of oil with station, it is often desired to measure the total flow rate since only in this mannner can one intelligently deduce the productive output of any one station.

Thus, it has been desired in the art to measure both the flow rate and the liquid composition within a well bore in order to obtain the most minimal indication of the various productivities of the strata. A concurrent measurement of both is accomplished by an instrument array generally designated by the numeral 50 which includes a capacitance probe 51 to measure liquid composition. In addition, a flow meter 53 and a temperature sensor 52 are shown.

The capacitance probe 51 includes a cylindrical dielectric insulator 153 surrounding a center conductor 154, insulator 153 being composed of a material impervious to the well fluids, such as a plastic. To minimize edge effects and to provide a bumper, a tip bulb 152 is formed on the end of the dielectric insulator 153. The lateral dimensions of the insulator 153 are conformed to the dimensions of the array 50 to present a minimal restriction to the fluid flow within the well bore and thereby minimize the effect on any boundary layer phenomena or pressure differentials across the lateral openings in the casing 11.

As the oil droplets 15 enter, through openings 13, and mix the water or brine entering at openings 14, the effective dielectric of the annular gap between the probe 50 and the casing 11 is increased in proportion. Casing 11 is furthermore connected as the instrument ground. Thus the center conductor 154 forms the ungrounded side of a capacitor which is isolated by the dielectric shield 153 of known dielectric strength and the thickness and which furthermore is separated by a gap filled with the oil-water mixture of variable dielectric strength from the walls of the casing 11 or ground. Since the capacitive effect will be essentially constant with all off-center alignments of probe 51 relative the interior of the casing 11, the reading thereof will therefore indicate changes attributable to the fluid mixture properties.

Since most frequently the fluids within the well bore contain various mineral solutions, it is necessary to hermetically contain any electrical components from a direct contact with the liquid. For this reason, the instrument array 50 comprises a cylindrical exterior housing 61 which provides both the enclosure and the ground for the circuit therein.

Referring to the capacitance probe 51, specifically, the dielectric insulator 153 extends from the exterior housing 61 to encase the center conductor 154. While illustrated on the exterior of housing 61, the center conductor 154 is connected on the interior of housing 61 to a voltage controlled oscillator 155 to be described in further detail hereinbelow, oscillator 155 in turn connecting to a driver 156 which impresses, across a coupling capacitor 157, the oscillatory signal onto the center lead 41 of a coaxial, shielded cable 40. Cable 40 is tied by its shield to the free upper end of the instrument housing 61 to provide the ground reference for the circuit sections therein and by way of the following description is also connected by throughconnections to the capacitance probe 51 where it excites, or where it also provides, D.C. electrical power to a voltage regulator 158. Voltage regulator 158 in turn provides the power both to the voltage controlled oscillator 155 and the driver 156. Thus, the center lead 41 of the coaxial cable 40 provides both the signal power for the electrical components within the instrument and also by way of A.C. superposition returns the signal output from the probe.

On the surface end, the coax cable 40 is looped around a pulley 42 and terminates on the distal side of the pulley 42 in a T-connector 43 which on one side connects to a D.C. power supply 44 and on the other side again across a coupling capacitor 45 to a squaring circuit 46 which drives a frequency-to-voltage converter 47 which then drives the pen of a conventional recorder 48.

As shown in FIGS. 2, 3A and 3B, the electrical components are disposed within the interior of housing 61 in cylindrical segments of which the segment 61a is exemplary, as shown in FIG. 2. More specifically, segment 61a includes a section of housing 61 as the exterior case thereof, having an upper end 62 conformed to receive a jack 63. Jack 63 is connected by a plurality of wires 65 to one side of a circular circuit board 66 which on the other side directly connects by way of several feedthrough conductors 67 to the upper side of yet another circular circuit board 68. These feedthrough conductors are then brought out on the other side of the circuit board 68 to the respective pins of a plug 69. In addition, jack 63 also connects to various electrical elements disposed between the circuit boards 66 and 68 and generally illustrated herein as elements 70. On the other side of board 68 one of the elements 70 is shown, in exemplary illustration, connected to a selected pin of plug 69.

In this manner, both feedthrough and circuit functions are provided within the narrow confines of the housing 61 by arranging the circuit components 70 with the longitudinal axes thereof along the longitudinal axis of housing 61. This manner of arrangement of circuit components allows for high density packing between te adjacent circuit boards while still maintaining the requisite reduced cross section necessary to minimize flow restrictions within the casing 11.

It is to be noted that the illustration shown in FIG. 2 is exemplary only. No attempt is made by way of this illustration to show any one particular circuit, it being understood that one skilled in the art will be able to execute any appropriate connections necessary to effect the operational circuits shown herein. In addition to the circuit components disposed between the two circuit boards 66 and 68, there are two threaded shafts 71 securing the circuit boards to the interior surface of plug 69. As shown in FIGS. 3A and 3B, in plan view, the circuit boards are shown as conventional perforated circuit boards with selected perforations thereof taken up by respective feedthrough conductors 67, the threaded shafts 71 and the various electrical components 70. Inasmuch as most discrete circuit elements terminate in long soldering connections, it is convenient to first lay out and connect one of the circuit boards and by progressive trimming arrange the other ends of the elements within the openings of the other circuit board to complete the connections. As shown in this illustration, it is intended that circuit board 68 be connected first and the free ends of the various electrical components including the feedthrough conductors 67 are then inserted within the openings of circuit board 66. The circuit board 66 is then brought to its vertical alignment by securing the threaded shafts 71 following which the appropriate solderings are made on the circuit board. Thus, the circuit board 68, shown in plan form in FIG. 3B, receives the various ends of elements 70 of which certain ones are then brought up to circuit board 66. Circuit board 66 then connects by connections 65 to the jack 63. By way of this construction, various discrete circuit sections can be formed. It is particularly noted that the general arrangement of signal return includes, as a manner of isolating from the D.C. power supply, an A.C. waveform. Thus, each instrument package will include, for example, a drive as a conventional circuit element. In addition, devices like voltage controlled oscillators appear with frequent repetition in various instrumentation arrangements. Thus, by connecting up a particular circuit within the instrument segment 61a, such circuit, depending on its general application, may be used repetitively at various locations within the probe 51.

With these teachings of a cylindrical element layout, the varous circuits necessary to accomplish a desired instrumentation are not taken up.

Figure 4:
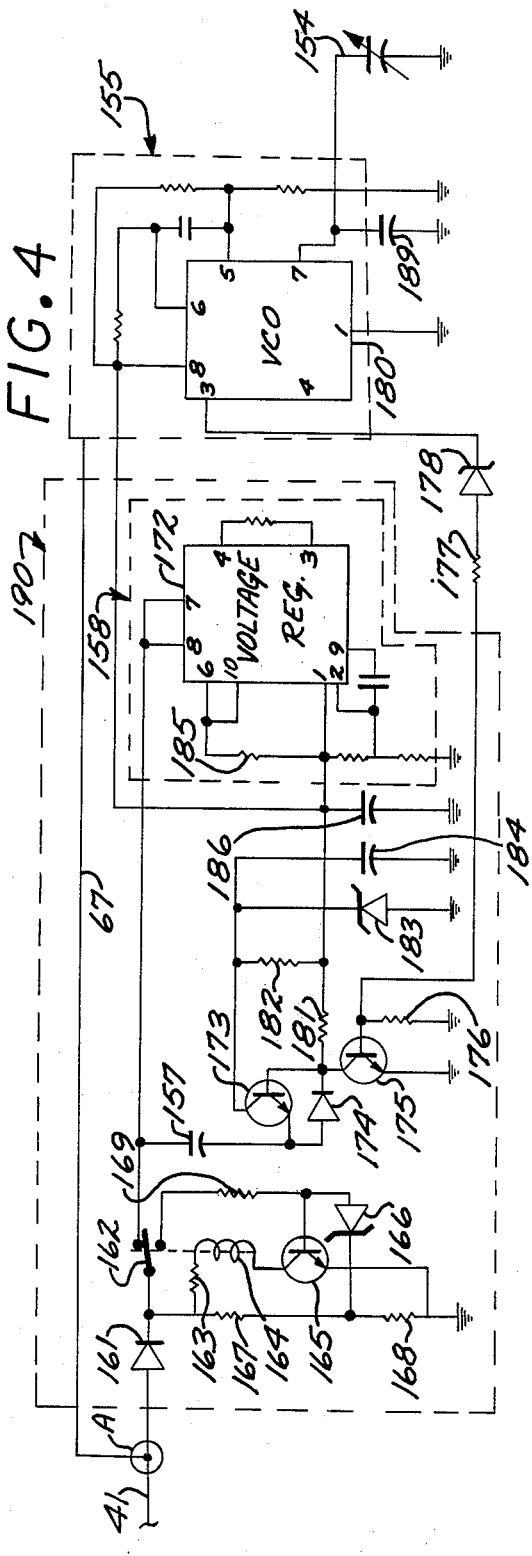
FIG. 4 is a circuit diagram of a capacitive measuring circuit for use as a fluid mixture measurement device.

As shown in FIG. 4, the center lead 41 of the coaxial cable 40 provides a signal A which across a diode 161 is connected both to a solenoid operated two-position switch 162 and across a current limiting resistor 163 in a series with a solenoid winding 164, articulating switch 162, to the collector of a transistor 165. Transistor 165 is configured in a common emitter circuit with its emitter grounded. The base of transistor 165 is controlled both by a Zener diode 166 referenced to the voltage division point between resistors 167 and 168 which are series connected between the cathode of diode 161 and ground and by a resistor 169 connected to one of the terminals of switch 162. Thus, when the voltage developed between resistors 167 and 168 exceeds the Zener breakdown of diode 166, transistor 165 is rendered conductive to excite winding 164, throwing switch 162 to a latched mode where it connects to the coupling capacitor 157 and to the power inputs of an integrated chip voltage regulator 172, such as a National Semiconductor LM 123 regulator. Coupling capacitor 157, on the other side, connects to the emitter of a transistor 173 and to the anode of a diode 174. The cathode of diode 174 is brought back both to the base of transistor 173 and to the collector of a transistor 175. Transistor 175 is again a common emitter transistor having a base bleed resistor 176 and receiving across a base resistor 177 and a Zener diode 178 the output of a voltage controlled oscillator 180, such as a National Semiconductor LM 566 voltage controlled oscillator. In addition to the connections described above, transistor 173 and transistor 175 receive the regulated output from voltage regulator 172 across a resistor 181 respectively at the base and the collector thereof. The regulated output of voltage regulator 172 is also connected across a collector resistor 182 to the collector of transistor 173 with a Zener diode 183 in parallel with a capacitor 184 connected to ground therefrom for regulation.

Voltage regulator 172, in conventional arrangement, includes a resistive divider 185 across the output thereof, a smoothing capacitor 186 further smoothing the regulated output, regulator 172 and the associated elements thereof providing the function of the regulator 158 in FIG. 1. The regulated output of voltage regulator 172 is in turn connected to the control inputs of the voltage controlled oscillator 180. Again, the voltage controlled oscillator 180 includes resistive dividers and various RC networks thereabout as suggested by the manufacturer, and in combination therewith performs the function of the controlled oscillator 155. In addition, the capacitive terminal, or the terminal controlling the oscillation rare of the voltage controlled oscillator is connected both to a fixed capacitor 189 and the variable capacitor formed by the capacitive probe 154.

With te foregoing description, a sensing circuit associated with probe 51 is shown wherein the change in capacitance due to the change in the dielectric strength of the liquid separating the center of the probe and casing 11, forming a common ground for the system, is registered as a change in the oscillation frequency in the voltage controlled oscillator 155. This oscillation frequency then controls transistor 173 to impress across coupling capacitor 171 an oscillatory signal periodically dropping to ground to ground onto the line carrying the signal A. This signal is therefore indicative in frequency of the presence of of oil within the annular cavity between the casing 11 and the probe 51.

Figure 5:
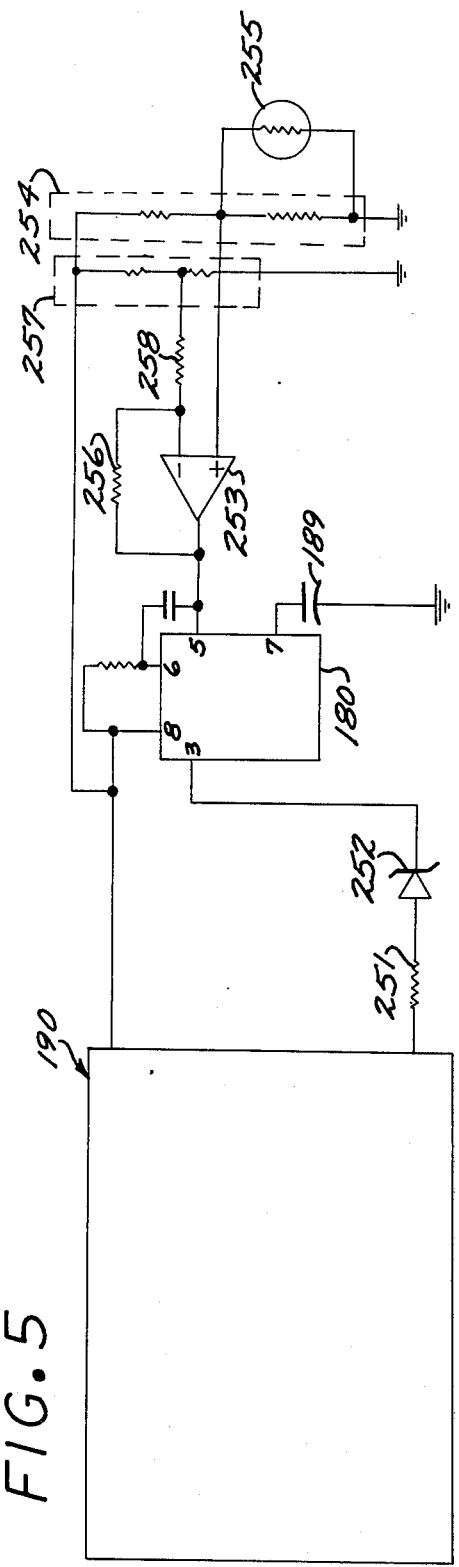
FIG. 5 is a measurement circuit adapted to sense the local temperature of the fluid.

Since in all instances where a particular parameter is measured a single lead is availably both to supply the power to the instrument at relatively remote distances and to return the measured signal, all other instruments necessarily provide similar outputs. More specifically, in FIG. 5 a segment of the above circuit is modified to provide for temperature sensing. Again, there is the necessity of providing a regulated voltage and some means of impressing the oscillatory signal onto the D.C. line as well as the selected switching of the particular instrument. Accordingly, the circuits around transistors 165, 173 and 175 and the voltage regulator 172 are common to the measuring circuit described in FIG. 5. For this reason, same circuit is shown by way of a block, designated by the numeral 190, it being understood that such circuit could be packaged in the arrangement shown in FIGS. 2, 3A and 3B, either as a single stack or as a plurality of stacks. As previously described, certain feedthroughs are necessary since the stacks are to be arranged in a vertical column. Thus, the generalized block 190 shown in FIG. 4 includes a feedthrough lead corresponding to the same conductor 67 in FIG. 2. The circuit around the voltage controlled oscillator, however, is necessarily distinct and it is therefore intended to provide distinct circuit arrangements for use in the capacitive measurement and in any measurement of temperature. More specifically, as shown in FIG. 5 the voltage controlled oscillator 180 outputs across a series connection of resistor 251 and a Zener diode 252 to connect to the base terminal of transistor 175 of the circuit block previously identified as circuit 190. The voltage controlled oscillator furthermore similarly includes resistive dividers across terminals designated by the manufacturer as terminals 8, 6 and 5 thereof which connect again to the output of the voltage regulator 172 in block 190. Terminal 5 of the voltage controlled oscillator 180, in this instance, is connected to the output of an operational amplifier 253 connected in the differential mode across a divider network having in its lower leg a divider network 254 having in its lower lower leg a thermistor 255 and connected at its upper leg to the regulated voltage signal.

Amplifier 253 is configured to a linear amplifier configuration by including a negative feedback resistor 256 thereabout which is summed wit a reference signal developed by d divider 257 and connected across an input resistor 258. Terminal 7 of the voltage controlled oscillator is again shown connected to ground across the fixed capacitor 189. Thus, while in the circuit shown in FIG. 4 a capacitor in parallel with capacitor 189 modulated the frequency of the voltage controlled oscillator in the circuit shown in FIG. 5, a voltage input to the control point of the voltage controlled oscillator is provided. The variation of the thermistor 255 with temperature therefore varies the voltage differential at the input of amplifier 253 with a resulting change in the ouput voltage. This output voltage then controls in a conventional manner the oscillation frequency of the voltage controlled oscillator 180.

Referring back to FIG. 1, in addition to the capacitive and temperature measurements, the instrument array 50 includes the aforementioned flow rate sensor 53. As shown in that Figure, rate sensor 53 is formed around a reduced diameter section of housing 61 and is again configured as a selectively stacked section thereof. Sensor 53 is formed in the manner of an external propeller 5 mounted for rotation in response to the fluid flow within a protective cage formed by a plurality of flexible straps 86 surrounding the blades of propeller 85. Propeller 85 includes within the hub thereof a conventional flux modulating magnetic slug (not shown) which induces a signal spike on an inductive pickup 286 shown in FIG. 6, inductive pickup 286 being connected across the differential inputs of an operational amplifier 287 configured as a zero crossing detector by virtue of a diode network 288 in the feedback thereof. The output of amplifier 287 is again capacitively coupled across a capacitor 289 to the output stage of a circuit similar to the output stage of circuit 190.

Specifically, capacitor 289 couples into the output terminal of a series voltage regulator, specifically to the emitter of a series regulating transistor 290 which at the collector connects across a diode 291 to the various feedthroughs eventually connecting with the center lead of cable 40. The collector of transistor 290 furthermore connects to a filtering network comprising a series connection of resistors 292 and 293 to ground, resistor 293 including a capacitor 294 thereacross. The juncture between resistors 292 and 293 controls, in tune, the cathode of a Zener diode 295 which by its anode drives the base of a transistor 296 connected in a common emitter circuit between the base of transistor 290 and ground. In addition, a base-collector resistor 297 is connected across transistor 290.

As previously described, the arrangement of parts comprising the regulator formed by transistors 290 and 296 can be collected between the two wafers shown in FIGS. 3A and 3B. This same regulator with small modification can be incorporated for the various other instruments of the instrumentation array 50. In this illustration, however, no means are provided for pulse commutating the voltage regulator and therefore a continuous flow rate monitoring is contemplated. Specifically, it is contemplated that the pitch and the expected flow rate around the flow meter are such that the eventual pulse frequency impressed across capacitor 289 onto the center lead of cable 40 be of a frequency separated by several decades from the expected frequency of the other instruments. Thus, a simple filtering scheme at the surface of the well will provide either in sequence or in parallel the requisite isolation of athe pulse rate generated by this instrument from the pulse rate generated by the various other instruments.

Figure 7:
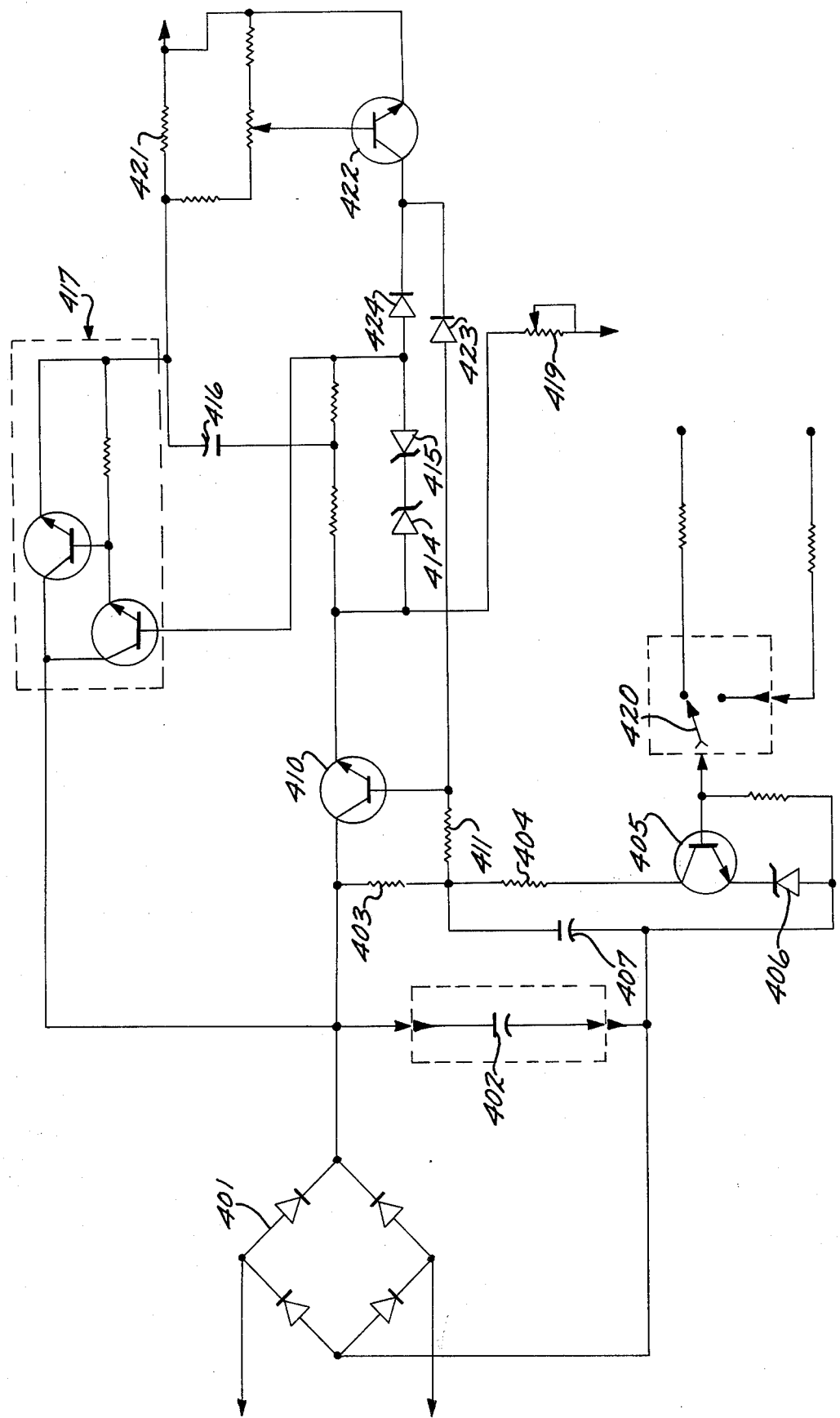
FIG. 7 is a circuit diagram illustrating a power supply useful with the present invention.

As shown in FIG. 7, a combination of a regulated power supply and a pulse generator is provided by way of the power supply 44 of FIG. 1. More specifically, the power supply includes a full wave rectifier 401 which is connected across any A.C. supply such as a conventional 117 volt, 60 cycle A.C. source. The rectified output of bridge 401 includes a smoothing capacitor 402 thereacross. Disposed across capacitor 402 is a reference amplifier circuit including a resistive divider collector leg comprising an upper resistor 403 and a lower resistor 404 in the collector circuit of a transistor 405 which by its emitter connects across a Zener diode 406 to the ground side of the bridge. Connected between the division point of the collector voltage divider, i.e., across the circuit including resistor 404, transistor 405 and diode 406 is yet another capacitor 407 which in combination with capacitor 402 provides a filter to the base of a series regulating transistor 410 connected in the high side circuit of the bridge 401 output. Transistor 401 is controlled at the base by the division point between resistors 403 and 404 across a base resistor 411. The emitter of transistor 410 is connected to a series circuit comprising resistors 412 and 413 disposed across two Zener diodes 414 and 415 in opposed bias. The division point between resistors 412 and 413 is connected across a capacitor 416 to the output of a Darlington stage 417. In addition, the emitter of transistor 410 is connected to ground across a variable resistor 419.

The base control of the reference amplifier stage around transistor 405 is developed across a commutating switch 420 which can be articulated by any mechanical means to apply the commutation signal to the common center conductor of cable 40. The emitter output of the Darlington stage 417 or the upper end of capacitor 416 is connected to a variable resistor 421 which at the wiper thereof is driving a transistor 422, the collector of transistor 422 being respectively connected across a diode 423 to resistor 411 and across a diode 424 to the resistor 413 of the Zener diode reference. In this manner a power supply which is effectively independent of the pulse frequency imposed on the center conductor or cable 40 is provided and which furthermore has the capability for impressing a predetermined pulse thereon. More specifically, capacitor 416 provides a relatively low impedance path while both the Darlington stage 417 and the back impedance of transistor 410 provide isolation to the power supply.

With the foregoing teachings, an instrumentation array generally designated by the numeral 50 is shown wherein three distinct instruments can be sequentially, or by frequency separation, communicating with the recorder 48. The function of the squaring circuit 46 and the frequency-to-voltage converter 47 are conventional and for that reason only passing reference is made thereto. More specifically, squaring circuit 46 may comprise a limiter amplifier in series with any conventional Schmitt trigger circuit while the frequency-to-voltage converter 47 may be of any commercially available form such as a frequency-to-voltage converter 4702 produced by the Teledyne Philbrick Corporation. In addition, the function of capacitor 45 may be taken on by various filtering circuits such that selective bandpass may be implemented to separate the above-mentioned signals from devices communicating at separated frequencies. The recorder 48 is fully conventional and may include a servo driven pen responsive to the linear signal developed by the frequency-to-voltage converter 47.

This instrumentation array therefore provides the most minimal required readings of both flow rate and liquid composition within a well bore. The readings are further enhanced by both total isolation from phenomena like drift and can be further compensated for any local temperature variations by proper adjustment of the readings made at recorder 48. While there are many other possible instrument station arrangements which can be practiced according to this invention, it is considered that the general functioning thereof be within the scope described herein. Thus, while only the most basic instruments are shown, additional instrumentation is contemplated within this invention.

Obviously, many modifications and variations of the present invention may be made with regard to the foregoing detailed description without departing from the spirit of the invention.

What is claimed is:

1. An instrumentation array for use in oil well logging, by measuring the parameters of the fluid in the well, comprising:
   a cylindrical housing;
   a plurality of circuit segments adapted for axial receipt within said housing, each circuit segment including feedthrough connections to transfer electrical signals between adjacent ones thereof;
   a plurality of sensing means interposed between selected ones of said segments, each sensing means being adapted to respond to a selected physical parameter of said fluid by producing a continuous analog signal indicative in amplitude of the amplitude of said parameter;
   an associated voltage controlled oscillator connected and disposed proximate each said sensing means for producing electrical pulses at a pulse rate corresponding to the amplitude of said analog signal from said sensing means;
   an associated voltage regulator connected to each said voltage controlled oscillator for applying a reference signal thereto;
   recording means disposed above said well bore producing a record indicative of said pulse rate;
   power supply means disposed above said well bore for producing a D.C. electrical signal; and
   cable means including a single conductive element connected to said recording and power supply means and across said feedthrough connections to each said sensing means for conveying said electrical pulses to said recording means and said D.C. electrical signal to each said voltage regulators in superposed relationship thereacross.

2. Apparatus according to claim 1 wherein:
   said recording means includes discrimination means for discriminating said pulses from said D.C. electrical signal.

3. Apparatus according to claim 2 wherein:
   said sensing means includes a capacitive probe adapted to sense the dielectric strength of the fluids within the well bore, a pulse generator connected to said capacitance prove and to said voltage controlled oscillator for producing a series of electrical pulses indicative by the pulse rate of said dielectric strength.

4. Apparatus according to claim 3 wherein:
   said sensing means further includes a temperature sensor adapted to provide a resistive variation in response to the temperature of said fluid, and a flow meter adapted to respond to the flow rate of said fluid.

* * * * *